Figure 1:
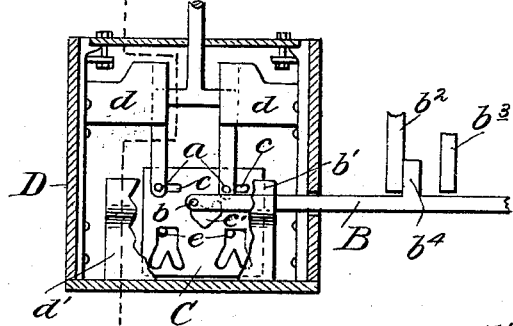

No. 754,050. PATENTED MAR. 8, 1904.
R. V. COLLINS.
MECHANICAL MOVEMENT.
APPLICATION FILED MAY 21, 1903.
NO MODEL.

Witnesses
F. L. Ourand.
Geo. H. Evans

Inventor
Roy V. Collins,
By Sturtevant & Graley
associate Attorneys

No. 754,050. Patented March 8, 1904.

UNITED STATES PATENT OFFICE.

ROY V. COLLINS, OF NEW YORK, N. Y., ASSIGNOR TO THE AMERICAN AUTOMATIC SWITCH COMPANY, OF NEW YORK, N. Y., A CORPORATION OF NEW YORK.

MECHANICAL MOVEMENT.

SPECIFICATION forming part of Letters Patent No. 754,050, dated March 8, 1904.

Application filed May 21, 1903. Serial No. 158,107. (No model.)

*To all whom it may concern:*

Be it known that I, ROY V. COLLINS, a citizen of the United States, residing in the borough of Manhattan, in the city, county, and State of New York, have invented certain new and useful Improvements in Mechanical Movements, of which the following is a specification, reference being had to the accompanying drawings, forming a part hereof.
This invention relates to mechanical movements or machine elements; and its object is to provide a mechanism for transmitting the motion of a prime mover and changing the direction of the motion so that the member to which it is transmitted shall be moved in opposite directions successively and to effect the transmission of the motion and its alternating changes of direction without reversing the direction of the motion coming from the prime mover.

Another object of the invention is to provide a mechanism of the nature referred to which shall be adapted for use in various machines or apparatuses where it is desired to impart to any member thereof a motion of the character described, and in particular to provide a mechanism which may be used in this connection and which will be adapted either to lock or leave unlocked, as may be desired, the member moved after each movement thereof, but in which said member will normally remain stationary during the intervals between the transmission to it of the successive motions of the prime mover.
A further object of the invention is to provide such a device for transmitting and changing the direction of motion communicated to it, so that after each movement of the member to which the motion is transmitted in one direction it will automatically adjust itself to move the member in the opposite direction.

In accordance with the invention a movable plate provided with a track adapted to engage the member to be moved for causing upon the movement of the plate by the prime mover the required movement of said member is loosely engaged by the prime mover and is caused to move always parallel to itself—that is, without any rotation whatever—by guiding-slots and shifting tracks which coöperate with fixed or relatively fixed parts, whereby the plate is brought by the successive movements of the prime mover first into a position to move said member in one direction and then to a position to move the member in the opposite direction.

The invention will be described in detail in connection with the accompanying drawings, in which—

Figure 2:
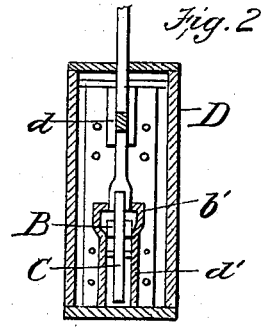

Figure 1 is a view, partly in elevation and partly in section, of mechanism embodying the invention, a portion of a centering-frame for the said mechanism being broken away to show the movable plate. Fig. 2 is a view of the mechanism in transverse section, taken on an irregular plane indicated by the line 2 2 in Fig. 1; and Figs. 3, 4, 5, and 6 are diagrammatic views, respectively, of successive positions of the movable plate with respect to the prime mover, the member moved, and fixed guiding-pins for the plate, the positions of the plate and of the member moved which immediately precede those shown in each of the Figs. 4, 5, and 6, respectively, being shown in dotted lines in these figures, so that the movement of the movable plate and the member moved may be the clearer.

Referring to Figs. 1 and 2, in which one convenient form of mechanism embodying the invention is illustrated, the prime mover is indicated at A, the member moved at B, and the motion-transmitting member or plate at C. The prime mover is preferably forked at its lower end, upon which are provided studs or lugs $a$, which engage the upper end of the movable plate or motion-transmitting member C, elongated slots $c$ being formed in said plate, in which slots the lugs work as the plate is shifted. The prime-mover is adapted to move vertically, and plates $d$ are provided within a housing D, which surrounds the entire mechanism in order to guide the prime mover in its movements.

The member moved or rod B is adapted to slide back and forth in a guide $b'$, which is part of a centering-frame $d'$ for the plate C, and said rod is capable of moving only longitudinally or in a straight line, and in the drawings said rod is shown to be adapted to move back and forth in a horizontal direction at right angles to the direction of the movement of the prime mover. For a purpose which will be clear as the description proceeds the movement of the rod B in either direction is limited, and any suitable means may be provided for checking the movement of this rod at the proper time, and, as shown in the drawings, Fig. 1, the movement of rod B is limited by two stops $b^2$ and $b^3$, which are engaged alternately when the device is in operation by a lug $b^4$ upon the rod B.

The motion-transmitting member or movable plate C is loosely or freely supported in housing D within the centering-frame $d'$. This plate is provided with means for engaging the member to be moved, B, to effect the proper movements of the same and also with means coöperating with fixed parts for guiding and shifting the plate during its movements. The first of these means, as shown in the drawings, may comprise a slot-and-pin connection $b\ c'$ between the member to be moved, B, and the movable plate C, the pin $b$ being provided upon the end of the member to be moved and the slot $c'$ being formed in the movable plate, while the means for guiding the plate comprise the fixed pins $e$, which work in slots $c^2$ in plate C. The means for shifting the plate comprise the upper part of slot $c'$ and the pin $b$, the latter at each end of its movement, as has already been seen, becoming relatively fixed. Both the guiding and shifting means, as will presently appear, serve to move the plate laterally, and for this reason both may be referred to as "guiding means" or as "shifting means;" but for the sake of clearness in describing and claiming the invention the slots $c^2$ and the fixed pins $e$ will be referred to as "guiding means," while the pin $b$ and the upper portion of the slot $c'$ will be understood to be meant when the term "shifting means" is used, and this for the reason that the pins $e$ and the slots $c^2$ coöperate to guide the plate, so as to bring the pin $b$ into the proper relation with the upper part of slot $c'$, and then by means of these last-named elements the plate is moved laterally or shifted.

Figure 3:
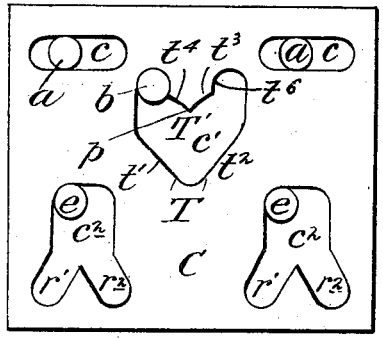

In order that the description of the new movement and its operation may be the more readily understood, brief reference will be had at this point to the elements of the movement and to the general plan of operation of the mechanism chosen herein to illustrate the movement, after which certain details of this mechanism will be described. Referring for this purpose to Figs. 3, 4, 5, and 6, where successive positions of the movable plate C are shown in relation to the member to be moved and to the fixed parts of the guiding and shifting means, Fig. 3 illustrates the position of the plate with respect to the lugs $a$, $b$, and $e$ for moving upon the next actuation of the prime mover the rod B to the right, while Fig. 6 illustrates the respective positions of these parts for moving said rod to the left. When the plate, with the parts in the position shown in Fig. 3, is drawn upward by lugs $a$ on the prime mover A, the lug $b$ will travel upon the portion $t'$ of an inclined cam-track T, which forms the lower edge of slot $c'$, and inasmuch as the plate is prevented from moving to the left by the lugs $e$ and as the lug $b$ can have no vertical movement the lug $b$ will be moved to the right along a horizontal line, as clearly seen in Fig. 4. When the plate is moved from the position shown in Fig. 3 and indicated by the dotted lines of Fig. 4 to the position shown in the full lines of Fig. 4, it will be prevented from any further upward movement by the fixed pins or lugs $e$ and also by the lugs $b$, as will be clearly seen upon reference to Fig. 4. The prime mover now being released by the actuating mechanism the plate will drop by gravity, it being understood, however, that a spring or any other equivalent means may be provided to effect the return of the plate, if desired. When the plate drops, it will be guided to bring the lug $b$ in contact with the upper right-hand edge of slot $c'$, so that upon the next upward movement of the plate said lug will engage the portion $t^2$ of the track T in order that the rod B may be moved back to its first position. It is for this purpose—namely, the bringing of lug $b$ into proper relation with the edge of slot $c'$ to effect the alternate backward and forward movements of rod B—that the guiding and shifting means for the plate are provided.

Figure 4:
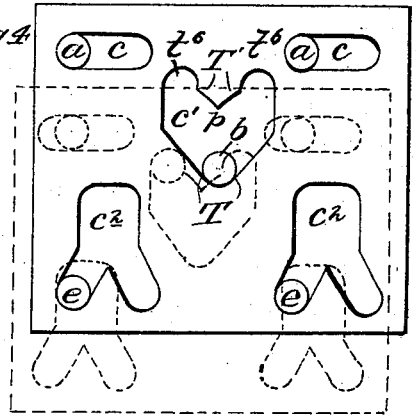

It will be observed that there was a slight swerving of the plate to the right during the upward movement of the plate, which has just been described, this being clearly shown in Fig. 4 and having been caused by the pins $e$ traveling in the recesses $r'$ of slots $c^2$. This swerving of the plate serves no purpose whatever, except to bring the pins $e$ and recesses $r'$ into the relative positions which they are seen to occupy in the full lines of Fig. 4, for when the plate drops from its position, as here shown, it is necessary that the apexial point or projection $p$ in the upper edge of slot $c'$, which point or projection is directly over the center of lug $b$, shall clear said lug upon the downward movement of the plate by passing well to the left thereof. For this purpose the plate is guided so as to cause it to swerve slightly to the left as it moves downwardly by the traveling of the recesses $r'$ upon the pins $e$. (Shown clearly in Fig. 5.)

Figure 5:
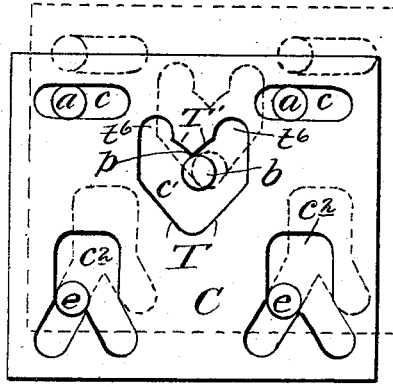
Figure 6:
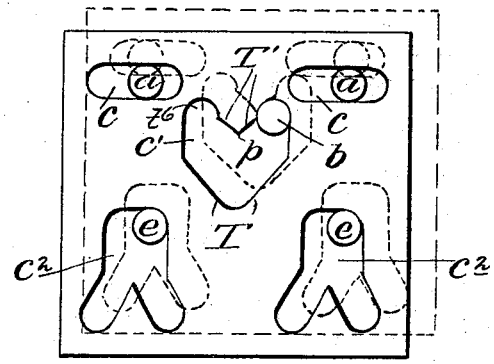

Fig. 5 illustrates the point in the present downward movement of the plate when the upper edge of slot $c'$ strikes lug $b$, the dotted lines showing the position of the plate when it commences its downward movement and which position is illustrated in full lines in Fig. 4. It will be remembered that in the present position of the lug $b$ said lug is immovable except toward the left on account of the lug $b^4$ being in contact with the stop $b^3$. When the projection $p$, therefore, strikes the lug $b$ in the manner illustrated in Fig. 5, said lug will be relatively fixed with respect to the plate, and accordingly the plate will slide upon said lug while the latter remains stationary, and the portion $t^3$ of a track T', which forms the upper part of slot $c'$, will be engaged by the lug $b$, thereby causing during the further downward movement of the plate the shifting of the same toward the left till all of the parts occupy the positions shown in the full lines of Fig. 6. Upon the next actuation of the plate by the prime mover (the parts being now as indicated in Fig. 6) it will be obvious that the rod B will be moved back in the opposite direction in precisely the same manner as it was moved forward. In this instance the portion $t^2$ of track T instead of the portion $t'$ of said track will engage the lug $b$ and effect the movement of rod B. The guiding of the plate in its downward movement will be effected by the lugs $e$ working in the recesses $r^2$ of slots $c^2$ instead of in the recesses $r'$ of said slots, and the plate will be swerved thereby slightly to the right, thus bringing the lug $b$ into engagement with the portion $t^4$ of track T' instead of the portion $t^3$ of said track, and the plate will accordingly be shifted toward the right. In this way, as will readily be seen, the plate will be brought back again into the position shown in Fig. 3. Thus it will be obvious that upon the successive actuations of the prime mover the plate and its coöperative parts will be brought alternately into the positions indicated, respectively, in Figs. 3 and 6, which are the positions which the plate occupies during the period of rest between the successive actuations of the same.

Having now set forth the general nature of the new movement and the elements which enter into it, certain specific details of the present embodiment of the invention will be briefly discussed and first concerning the plate C. This part has been referred to as a "plate" in the foregoing description in order to simplify the explanation of the invention. It may, however, be simply a frame or any other form of carrier for the operative parts of the same—namely, the guiding and both the rod and plate shifting tracks. The plate-shifting tracks T and the rod-shifting track T' form the sides of a single slot $c'$, the shape of which is very nearly that of the conventional heart and the location of which is at the center of the plate. The location of the slot is not important, however, except that its position in the center of the plate serves to balance the plate and is a convenient location for the same. The shape of this slot, it will be seen, may be varied considerably without altering its function or preventing the successful operation of the device. The present shape has been found to be the most satisfactory one for the purpose. Furthermore, as will readily be seen, the track T', with its two oppositely-inclined portions $t^3$ and $t^4$ and the projection $p$ between them, might be formed in a separate slot instead of being combined with the track T in slot $c'$, and in that event a fixed pin or an additional pin upon rod B would be provided to coöperate with the track T'.

The slots $c^2$ are preferably shaped like an inverted Y, although it is not essential that they assume precisely the shape shown in the drawings for the proper and successful performance of their functions.

The motion-transmitting member or plate C is loosely or freely supported within the centering-frame $d'$ in the sense that no portion of said plate is fixed or stationary, as would be the case were the plate designed to rotate. It has heretofore been customary to give to a rod or other member, as B, an alternating backward and forward movement by providing a rotative motion-transmitting member which engages the same. Such a device, however, as stated above, is undesirable, inasmuch as there are dead points or centers at which the mechanism is liable to stick, and thereby become inoperative. In the present case, on the other hand, the motion-transmitting plate has a limited freedom of movement, which movement is always motion of translation, the plate as a whole being translated from one position to another—that is, all its points move simultaneously through the same distance in the same direction. To effect this translatory movement or rather to maintain the proper balance upon the plate during its movement, the prime mover A is made to engage the plate C at both ends of said plate, and two guiding-slots $c^2$ are provided, one at each end of the plate, and the slot $c'$ is placed in the center of the plate. It is clear, however, that the provision of the two slots $c^2$ and the two points of engagement for the prime mover are not essentials, as if centrally located upon the plate one such slot and one point of engagement for the prime mover will suffice.

The rod B will as a rule form an element or part of the machine or apparatus to which the invention is applied, and likewise the means for limiting the movement of said rod will also reside in the machine or apparatus to which the invention is applied. Accordingly, it will be understood that the parts of the present mechanism $b^2$, $b^3$, and $b^4$ (shown in Fig. 1 of the drawings) are arbitrary. Furthermore, the rod B, as will be obvious, may serve to transmit motion to a machine or machine part located at a distance from the mechanism described and shown herein.

By an examination of Figs. 1 and 3 it will readily be seen that by applying a force along the rod B, directed toward the right, said rod may be moved toward the right, in which case the pin or lug $b$ will travel across the track T', thus raising the plate C slightly and dropping it again as pin $b$ passes the projection $p$; but, if desired, those portions of the slot in which the pin $b$ rests after each actuation of the plate—that is, the upper right and left hand portions of said slot—may be slightly recessed, as at $t^6$, so as to lock the pin $b$ from lateral movement with respect to the plate which might be caused by an external force acting along the rod B. In the one case, therefore, the rod B will be left unlocked, while in the other case it will be locked against any external disturbance.

In describing the mechanism shown herein, it has been assumed that the plate C is required to be vertically disposed and also that it is required to be disposed in an upright position, as illustrated in all the figures of the drawings. Such a condition, however, is not a necessity. The mechanism will operate in the same manner if the plate be inverted or horizontal. If the plate is inverted and the motion of the prime mover is imparted to the present lower end of the plate, which in the case supposed becomes the upper end, the resting position of the plate between each successive actuation of the same by the prime mover will be with the pin $b$ resting in the apex of the slot $c'$, as shown in Fig. 4. With the exception of changing the resting position of the plate the manner of operation of the mechanism will be precisely the same as in the case described and will therefore be readily understood.

The invention, accordingly, is not limited to the precise mechanism shown or to any one way in which the mechanism shown may be used, for the mechanism is capable of being varied both in its construction and in its manner of use, while the essential elements of the mechanism and of the invention are preserved.

I claim as my invention—

1. In a motion-transmitting device, the combination of a prime mover, a member to be moved, a motion-transmitting member engaged by the prime mover and the first-named member, and means engaging the motion-transmitting member to cause it to have a motion of translation when actuated by the prime mover to change its position with respect to the first-named member.

2. In a motion-transmitting device, the combination of a prime mover, a member to be moved, a freely-supported motion-transmitting member engaged by the prime mover and the first-named member, and means engaging the motion-transmitting member to translate it and change its position with respect to the first-named member.

3. In a motion-transmitting device, the combination of a prime mover, a member to be moved, a motion-transmitting member engaged by the prime mover and the first-named member, and means engaging the motion-transmitting member to translate it laterally to change its position with respect to the first-named member.

4. In a motion-transmitting device, the combination of a prime mover, a member to be moved, a motion-transmitting member engaged by the prime mover and the first-named member, and means to translate the second-named member laterally after each actuation thereof by the prime mover to change its position with respect to the first-named member.

5. In a motion-transmitting device, the combination of a prime mover, a member to be moved, a motion-transmitting member engaged by the prime mover and the first-named member, and means to translate the second-named member alternately first toward one side and then toward the other side to change its position with respect to the first-named member.

6. In a motion-transmitting device, the combination of a prime mover, a member to be moved, a motion-transmitting member between the prime mover and the member to be moved, a pin-and-slot connection between the first and second named members, and means for translating the second-named member to change the position of the pin in the slot.

7. In a motion-transmitting device, the combination of a prime mover, a member to be moved, a freely-supported motion-transmitting member between the prime mover and the member to be moved, a pin-and-slot connection between the first and second named members, and means to change the position of the pin in the slot.

8. In a motion-transmitting device, the combination of a prime mover, a member to be moved, a motion-transmitting member between the prime mover and the member to be moved, a pin-and-slot connection between the first and second named members, and means for translating the second-named member laterally after each actuation thereof by the prime mover to change the position of the pin in the slot.

9. In a motion-transmitting device, the combination of a prime mover, a member to be moved, a motion-transmitting member engaged by the prime mover and the first-named member, an inclined track on the second-named member adapted to engage a relatively fixed part to change the position of the second-named member with respect to the first-named member, and means for guiding the second-named member to bring said track and fixed part into the proper relation.

10. In a motion-transmitting device, the combination of a prime mover, a member to be moved, a motion-transmitting member engaged by the prime mover and the first-named member, an inclined track on the second-named member adapted to engage the first-named member to change the position of the second-named member with respect to the first-named member, and means for translating the second-named member to bring said track and first-named member into the proper relation.

11. In a motion-transmitting device, the combination of a prime mover, a member to be moved, a motion-transmitting member engaged by the prime mover and the first-named member, a track having two oppositely-inclined portions on the second-named member adapted to engage a relatively fixed part to change the position of the second-named member with respect to the first-named member, and means for guiding the second-named member to bring said track and fixed part into the proper relation.

12. In a motion-transmitting device, the combination of a prime mover, a member to be moved, a motion-transmitting member engaged by the prime mover and the first-named member, a track having two oppositely-inclined portions on the second-named member adapted to engage a relatively fixed part to change the position of the second-named member with respect to the first-named member, and means for guiding the second-named member to cause each portion of the track to be engaged alternately by the fixed part after each successive actuation of the second-named member by the prime mover.

13. In a motion-transmitting device, the combination of a prime mover, a member to be moved, a freely-supported motion-transmitting member engaged by the prime mover and the first-named member, means for guiding the second-named member laterally after each actuation thereof by the prime mover, and means for shifting the second-named member to change its position with respect to the first-named member, which means are brought into operation by the guiding means.

14. In a motion-transmitting device, the combination of a prime mover, a member to be moved, a freely-supported motion-transmitting member having two resting positions and engaged by the prime mover and the first-named member, a track having two oppositely-inclined portions on the second-named member adapted to engage a relatively fixed part to shift the connection between said members, and means for guiding the second-named member after each actuation thereof by the prime mover to cause each portion of the track to be engaged alternately by the fixed part to bring the second-named member into one position of rest after one actuation of the prime mover and into the other position of rest after the next actuation of the prime mover.

15. In a motion-transmitting device, the combination of a prime mover, a member to be moved having a limited freedom of movement, a motion-transmitting member between the prime mover and the member to be moved, a pin-and-slot connection between the first and second named members, and means to translate the second-named member laterally after each actuation thereof by the prime mover to change its position with respect to the first-named member.

16. In a motion-transmitting device, the combination of a prime mover, a member to be moved having a limited freedom of movement, a motion-transmitting member engaged by the prime mover and the first-named member, an inclined track on the second-named member adapted to engage the first-named member while in one of its limiting positions to change the position of the second-named member with respect to the first-named member, and means for translating the second-named member to bring said track and second-named member into the proper relation.

17. In a motion-transmitting device, the combination of a prime mover, a member to be moved, a motion-transmitting member engaged by the prime mover, a cam-track upon the second-named member adapted to engage and to move the first-named member, and means for translating the second-named member to change the position of the track with respect to the first-named member.

18. In a motion-transmitting device, the combination of a prime mover, a member to be moved, a motion-transmitting member engaged by the prime mover, a cam-track with two oppositely-inclined portions upon the second-named member adapted to engage and to move the first-named member, and means for translating the second-named member to change the position of the track with respect to the first-named member.

19. In a motion-transmitting device, the combination of a prime mover, a member to be moved, a motion-transmitting member engaged by the prime mover, a cam-track with two oppositely-inclined portions upon the second-named member, a pin or lug upon the first-named member adapted to engage said track whereby the first-named member may be moved, and means for translating the second-named member to change the position of the track with respect to the pin or lug.

20. In a motion-transmitting device, the combination of a prime mover, a member to be moved, a motion-transmitting member engaged by the prime mover, a cam-track upon the second-named member adapted to engage and to move the first-named member, a second track on the second-named member adapted to engage a relatively fixed part to shift the position of the cam-track with respect to the first-named member, and means for guiding the second-named member to bring said second track and fixed part into the proper relation.

21. In a motion-transmitting device, the combination of a prime mover, a member to be moved, a motion-transmitting member engaged by the prime mover, a cam-track with two oppositely-inclined portions upon the second-named member adapted to engage and to move the first-named member, a second track on the second-named member adapted to engage a relatively fixed part to shift the position of the cam-track with respect to the first-named member, and means for guiding the second-named member to bring said second track and fixed part into the proper relation.

22. In a motion-transmitting device, the combination of a prime mover, a member to be moved having a limited movement, a motion-transmitting member and engaged by the prime mover, a cam-track with two oppositely-inclined portions upon the second-named member, a pin upon the first-named member adapted to engage said track whereby the first-named member may be moved, a second track upon the second-named member adapted to engage said pin to shift the position of the cam-track with respect to the pin, and means for guiding the second-named member to bring said second track and pin into the proper relation.

23. In a motion-transmitting device, the combination of a prime mover, a member to be moved, a motion-transmitting plate engaged by the prime mover, said plate having a slot with two tracks each track having two oppositely-inclined portions, and a pin on the member to be moved lying within said slot and adapted to engage one of the portions of one of the tracks when the plate is actuated by the prime mover whereby the member to be moved is moved in one direction and then to engage one of the portions of the other track whereby the plate is shifted to bring the other portion of the first track into such a position that upon the next actuation of the plate the member to be moved will be moved in the opposite direction and the plate will be shifted to its first position.

24. In a motion-transmitting device, the combination of a prime mover, a member to be moved, a plate engaged by the prime mover, said plate having a slot with two tracks each track having two oppositely-inclined portions, a pin on the member to be moved lying within said slot and adapted to engage one of the portions of one of the tracks when the plate is actuated by the prime mover whereby the member to be moved is moved in one direction and then to engage one of the portions of the other track whereby the plate is shifted to bring the other portion of the first track into such a position that upon the next actuation of the plate the member to be moved will be moved in the opposite direction and the plate will be shifted to its first position, and means for guiding the plate to bring the shifting track and pin into the proper relation directly after each actuation of the plate by the prime mover.

25. In a motion-transmitting device, the combination of a prime mover, a member to be moved, a motion-transmitting member engaged by the prime mover and the first-named member, means to shift the position of the second-named member to change the position of said member with respect to the first-named member, said second member having a guide-slot with two recesses, and a fixed pin in said slot.

26. In a motion-transmitting device, the combination of a prime mover, a member to be moved, a motion-transmitting member engaged by the prime mover and the first-named member, an inclined track on the second-named member adapted to engage a relatively fixed part to change the position of the second-named member with respect to the first-named member, said second-named member having a guide-slot with two recesses, and a fixed pin in said slot.

27. In a motion-transmitting device, the combination of a prime mover, a member to be moved, a motion-transmitting member engaged by the prime mover and the first-named member, a track having two oppositely-inclined portions on the second-named member, said second-named member having a guide-slot with two recesses, and a fixed pin in said slot, whereby the second-named member is guided after successive actuations by the prime mover first toward one side and then toward the other side.

28. In a motion-transmitting device, the combination of a prime mover, a member to be moved, a plate engaged by the prime mover, said plate having a slot with two tracks each track having two oppositely-inclined portions, a pin on the member to be moved lying within said slot and adapted to engage one of the portions of one of the tracks when the plate is actuated by the prime mover whereby the member to be moved is moved in one direction and then to engage one of the portions of the other track whereby the plate is shifted to bring the other portion of the first track into such a position that upon the next actuation of the plate the member to be moved will be moved in the opposite direction and the plate will be shifted to its first position, said plate having a guide-slot with two recesses, and a fixed pin in said slot, whereby the plate is guided after successive actuations of the prime mover first toward one side and then toward the other side.

29. In a motion-transmitting device, the combination of a prime mover, a member to be moved, a motion-transmitting member engaged at each end by the prime mover, a pin-and-slot connection between the first and second named members, and means for translating the second-named member to change the position of the pin in the slot.

30. In a motion-transmitting device, the combination of a prime mover, a member to be moved, a plate engaged by the prime mover and having a heart-shaped slot and a Y-shaped slot, a pin on the member to be moved lying in the heart-shaped slot, and a fixed pin in the Y-shaped slot.

31. In a motion-transmitting device, the combination of a prime mover, a member to be moved having a limited freedom of movement, a plate having a heart-shaped slot in the center and two Y-shaped slots at either end, a pin on the member to be moved and lying in the heart-shaped slot, and a fixed pin in each of the Y-shaped slots.

32. In a motion-transmitting device, the combination of a prime mover, a rod to be moved capable only of a limited longitudinal motion, a motion-transmitting plate engaged by the prime mover and the rod, means to move the rod in opposite directions upon successive actuations of the prime mover, means to guide the plate in opposite directions upon successive actuations of the prime mover, and means to shift the plate after each actuation of the prime mover.

This specification signed and witnessed this 14th day of May, A. D. 1903.

ROY V. COLLINS.

In presence of—
 H. H. PENNOCK,
 B. H. SCHER.